Feb. 7, 1961  R. LEROUX  2,970,559
VESSELS FOR THE TRANSPORT OF LIQUEFIED GASES
Filed Dec. 23, 1957  4 Sheets-Sheet 1
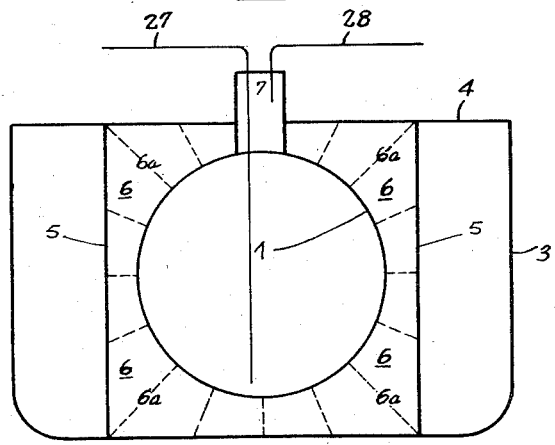
Fig: 1
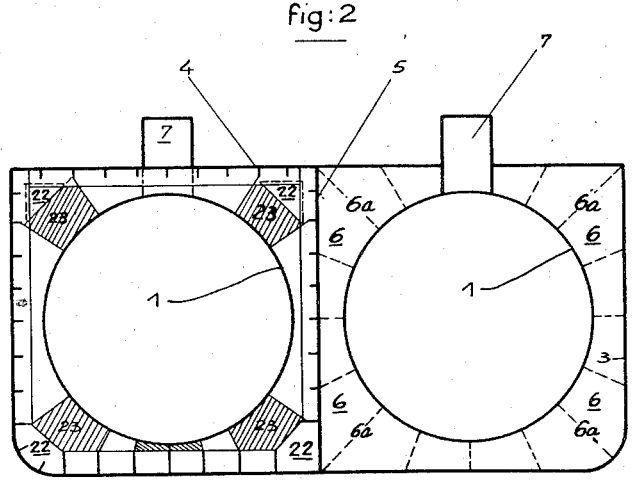
Fig: 2
INVENTOR
RENÉ LEROUX
BY
*Kenway, Jenney,*
*Witter & Hildreth*
ATTORNEYS Feb. 7, 1961 R. LEROUX 2,970,559
VESSELS FOR THE TRANSPORT OF LIQUEFIED GASES
Filed Dec. 23, 1957 4 Sheets-Sheet 2
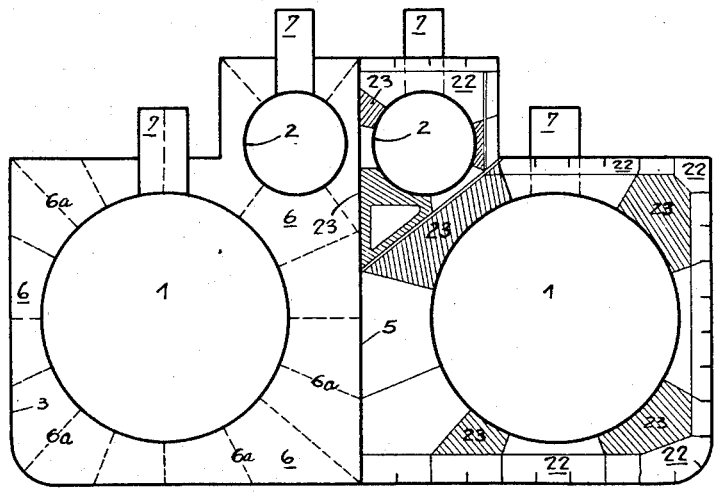
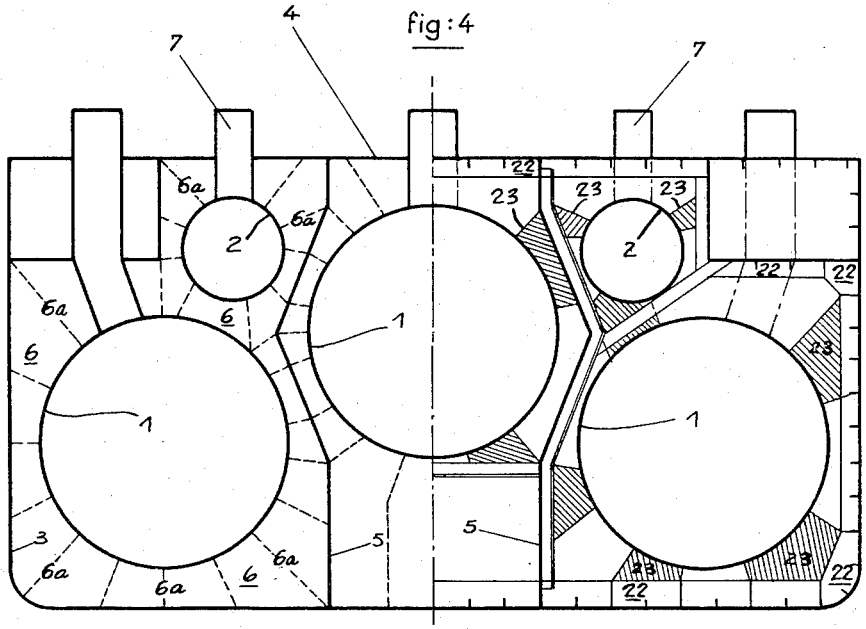
INVENTOR
RENE' LEROUX
BY
ATTORNEYS Feb. 7, 1961 R. LEROUX 2,970,559
VESSELS FOR THE TRANSPORT OF LIQUEFIED GASES
Filed Dec. 23, 1957 4 Sheets-Sheet 3
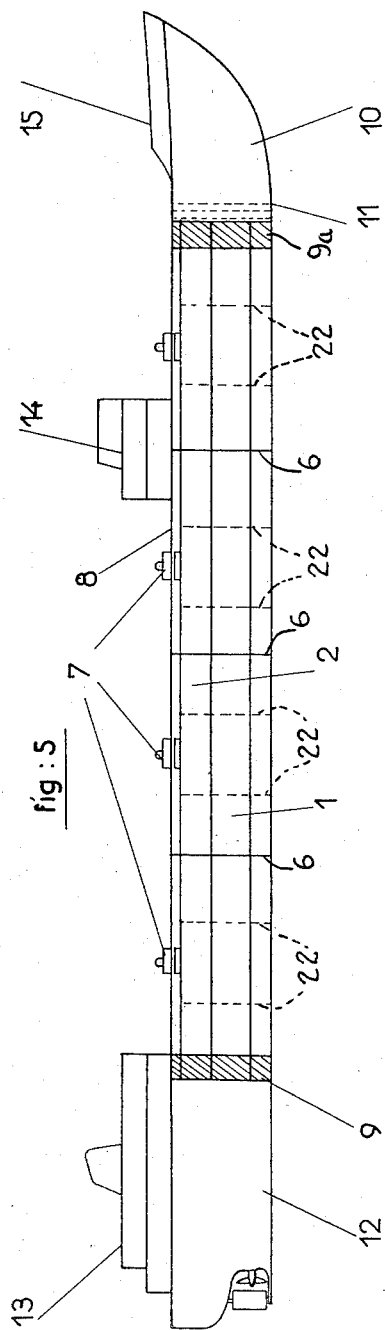
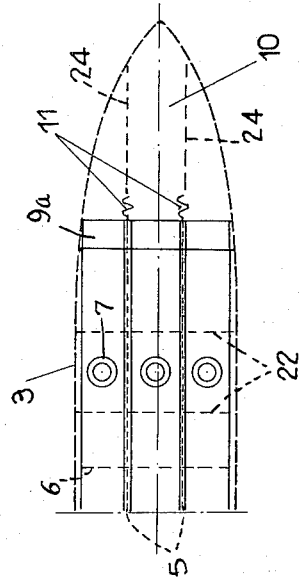
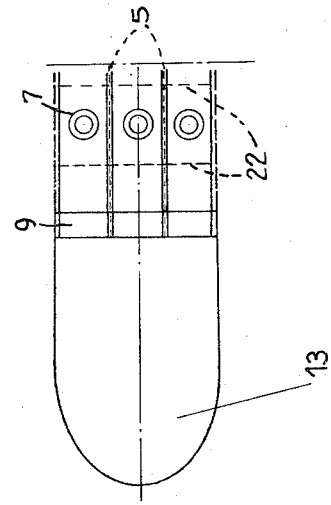
INVENTOR
RENÉ LEROUX
BY
ATTORNEYS

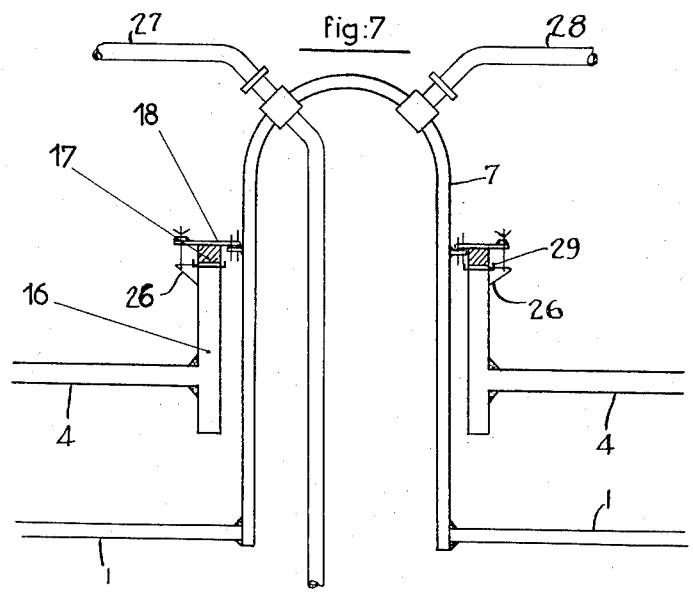
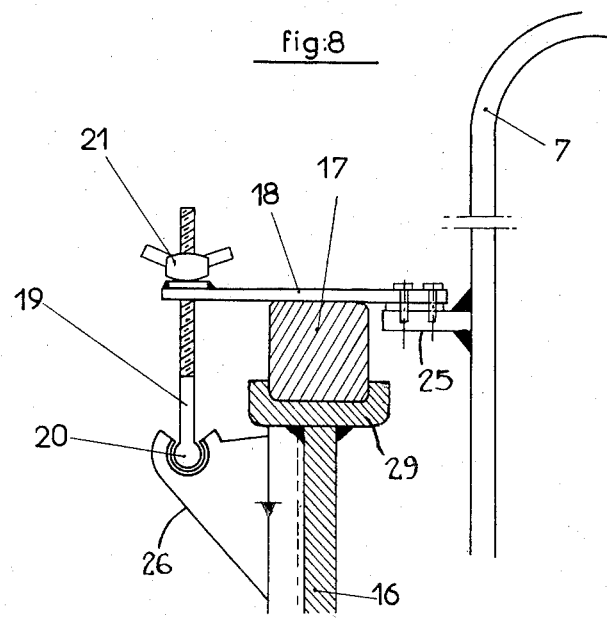

2,970,559

VESSELS FOR THE TRANSPORT OF LIQUEFIED GASES

René Leroux, 23 Rte. de Paris, Nantes-Chantenay, France

Filed Dec. 23, 1957, Ser. No. 704,537

Claims priority, application France Oct. 1, 1957

2 Claims. (Cl. 114—74)

This invention relates to vessels for the transport of hydrocarbons liquified under pressure.

The transport and storage of liquefiable gases may be carried out in two ways:

(1) In the liquid state and under atmospheric pressure, thus making the use of refrigerating apparatus absolutely necessary this refrigerating apparatus is usually land.

(2) In the liquid state and at ordinary temperature, so necessitating the use of pressure-resistant tanks to contain the fluid under pressure.

The first method has the disadvantage of requiring an expensive refrigerating equipment and power consumption. On the other hand it allows the use of tanks which do not have to resist great pressure and are consequently lighter and cheaper. Utilization of such tanks for transport presents serious difficulty on account of the need to take into account calorific expansion and of the ecect of low temperatures upon the mechanical characteristics of the metal forming the tank. Moreover, the absence of pressure complicates loading and unloading operations. However this method is unavoidable for the transport of such gases as methane, which cannot be liquefied at ordinary temperature.

The second method has the disadvantage of requiring pressure-resistant tanks made of thick plates, which tanks are heavy and rather expensive to build; but as all fluid is maintained at ambient temperature, it is easy to rigidly bind these tanks with the body intended to carry them, and even to make them contribute to the stiffness of this body, which, to a certain extent, reduces the objection to the great weight of these tanks. Calorific expansion is not to be feared, but it is replaced by mechanical problems due to expansion caused by the fluid pressure. Loading and unloading operations are very easily performed on account of the pressures existing in the tanks.

Various problems related to the transport and storage of liquefiable gases are considered in my copending United States applications Serial No. 560,248, filed January 19, 1956, and No. 590,881, filed June 12, 1956.

The present invention relates to the second of the above methods and is principally (but not exclusively) concerned with the sea-transport of the gases butane and propane in the liquid state.

The transport under pressure of these fluids has the advantage that the very thick plating of the tanks is a better safeguard against inopportune leakage of fluid than the thin tanks used for transport under atmospheric pressure and refrigeration.

Regarding atmospheric temperatures, regulations in preparation consider the figure of 65° C. in hot seas and 58° C. in temperate seas. These figures involve high pressures. It would be better to maintain the tanks at sea-water temperature. The best way to achieve this would be to place the tanks in direct contact with the sea, which would avoid the need for a separate hull. (The above mentioned applications describe several examples of this). However present regulations require that at least a 60 cm. ballast tank should be provided between the hull and the tank for the liquified gas. This ballast tank in itself constitutes a danger, since gases heavier than air coming from leakages gather therein and are liable to give rise to fires and explosions. Furthermore this ballast tank has the disadvantage of providing thermal insulation and does not allow cooling of the liquefied gas by sea water.

The invention accordingly provides a vessel for the simultaneous transport of pressure-liquified hydrocarbons at ordinary temperatures and of refined liquid fuel (e.g. oil white products or gas-oil) comprising one or more pressure-resistant tanks for the hydrocarbon, running lengthwise of the vessel and arranged to contribute to its longitudinal stiffness, a dome on each tank, and one or more tanks for the liquid fuel which tanks are not adapted to resist pressure and completely surround the pressure-resistant tank(s) apart from the dome(s) thereof whereby when full of liquid fuel to insulate the pressure-resistant tank(s) and help to maintain them at a temperature substantially that of the water upon which the vessel floats. With this arrangement the advantages are twofold. On the one hand the risk of fire or explosion is restricted, since the gases escaping at the surface of oil white products or the like can be evacuated as in a standard tanker; and on the other hand the heat conduction of the oil white products helps to keep the tanks at sea-water temperature.

Furthermore, according to the invention the advantage is obtained of the combined transport of butane and propane gases and oil white products, all three being generally refined, and also consumed, in the same areas.

While methane is extensively produced at oil drilling installations and must necessarily be transported from the oil wells to the places where it is utilized butane and propane gases chiefly result from the refining operations carried out for example in Europe and have to be transported from Europe towards lands deficient in natural power sources. Upon the whole, they follow the same route as refined products and their transport may be combined with advantage. On the return journey the ballast tanks will be filled by sea-water for ballasting the vessel.

Vessels according to the invention may exhibit numerous arrangements depending on the desired number of tanks, from a single tank up to a whole series of tanks some for butane and some for propane.

The accompanying diagrammatic drawings illustrate by way of example various embodiments of the invention; in the drawings:

Figures 1, 2, 3 and 4 are schematic transverse sectional views of vessels according to the invention having respectively one, two, four and five fluid tanks.

Figures 2, 3 and 4 showing on one side of the centre line the passage of the tanks through bulkheads and on the other side the location of such tanks by way of the web-frames.

Figure 5 is a vertical longitudinal section of a vessel such as shown in Figure 4.

Figure 6 is a schematic horizontal section corresponding to the Figure 4.

Figures 7 and 8 are details illustrating the joint between a dome and the deck.

Each vessel illustrated comprises a pressure-resisting tank 1 for butane: the vessels shown in Figures 2 and 3 contain two such tanks, the vessel of Figure 4, three. The vessels of Figures 3 and 4 contain also pressure-resisting tanks 2 for propane. In each vessel the tanks are housed within a hull 3 and covered over by a deck 4 through which project domes 7 communicating with the interior of the tanks.

Each vessel has one or more longitudinal bulkheads 5 and transverse bulkheads 6. These transverse bulkheads are flexible and provided with radiating supporting members or stiffeners 6a shown dotted. Each transverse bulkhead 6 is generaly annular in shape with its inner periphery secured to the butane pressure resisting tank 1 and its outer periphery secured to the surrounding part of the hull 3, longitudinal bulkhead 5 and deck 4. In Figures 3 and 4 the transverse bulkheads 6 also surround and are secured to the propane tanks 2.

Because of longitudinal extension of the tanks 1 and 2 due to internal pressure, the connections between the hull 3 and the tanks 1 and 2 have to be flexible: they are effected by flexible seating brackets 23 and webs 22, shown hatched in the various figures.

Referring to Figures 5 and 6, the vessel comprises an after-section 12 including the engine room and carrying superstructure 13. The middle section of the ship, containing the tanks 1, 2 and including the surrounding hull 3 and deck 4, and the longitudinal bulkheads 5 are rigidly secured to the after-section 12 and separated therefrom by the cofferdams 9: the middle section carries the navigating bridge 14. The hull of the fore-part 10 of the vessel, carrying the forecastle 15, is rigid and continuous with that of the middle section, the sections being separated internally by fore-cofferdams 9a which, away from the hull, are capable of slight movement relative thereto. The fore part 10 has longitudinal bulkheads 24 aligned with the longitudinal bulkheads 5 of the middle section: these have a corrugated portion 11 to take up movement due to longitudinal extension of the tanks 1, 2.

Detail views illustrating the connection between each dome 7 and the surrounding deck are given in Figures 7 and 8. A deep cylindrical coaming 16 projects upwards from the deck around the dome 7 and is spaced from it and a horizontal flange 25 is formed about the dome adjacent the top of the coaming. An annular plate 18 of sufficiently light gauge as to be somewhat flexible has its inner periphery secured and sealed to the flange on the dome 7 and its outer periphery extending well beyond the coaming 16. The upper end of the coaming supports an annular seat 29 which in turn carries an annular block 17 of an elastic plastics material resistant to attack by hydrocarbons, against which the plate 18 is clamped by means of bolts 19 having ball-ends 20 located in brackets 26 on the coaming 16: wing-nuts 21 on the bolts 19 bear on the top of the plate. The dome 7 is thus able to move slightly relatively to the deck and coaming 16, both vertically and lengthwise of the ship. The dome is pierced by two openings permitting the passage of two pipes, the one 27 extending to the bottom of the tank permitting the filling and emptying of the liquefied gas; the other 28, which extends from the dome, permits the evacuation and introduction of gas.

From the foregoing it will be appreciated that a vessel such as shown in Figures 4, 5 and 6 comprises the following main parts:

A. A stiff and expandable part including—

(a) The tanks 1, 2 built of thick plates and having inner bulkheads (not shown);

(b) The parts of the transverse bulkheads 6 immediately surrounding such tanks.

These tanks are connected between themselves by bulkheads and supported by way of web-frames 22 and flexible brackets 23 with radiating supports which connect them to girders rigid with the hull.

This part A is liable to longitudinal expansion owing to pressure inside the tanks.

B. A stiff but not expandable part 12, rigidly fixed to the previous one and including all parts of the vessel aft of the tanks—sternpost, engine seatings, engine-room.

Connection between the parts A and B is provided on the one hand by extensions aft of the cofferdam 9 including extensions of the tanks which as far as possible preserve the scantling and structure of corresponding elements of part A; thus thick elements of the tanks, as far as possible, are extended to form stiff elements of the aft part, especially the seatings of the engine-room, girders under the deck and the like.

C. A hull constituted of material of small scantling forming the outside walls of the oil white products ballast-tanks, viz hull plating 3, web-frames, decks 4 and longitudinal bulkheads as well the whole fore compartment 10 and the seatings which carry the tanks by way of the web-frames 22 and flexible brackets 23.

This part is in principle stiff and not expandable therefore it has to be free for movement relative to the part A. Its sidings can be lightened if the liquefied gases tanks provide a part of the longitudinal stiffness of the ship.

D. Flexible elements comprising the bulkheads 6, the web-plates 22 and brackets 23 connecting the hull C with the expandable part A. The connections to the tanks are made adjacent transverse bulkheads within and dividing the tanks. The flexible bulkheads 6 have no vertical stiffeners—instead the stiffeners 6a, which are secured to the hull by ordinary brackets, run radially of the tank axes so that the bulkheads can take up a slightly conical shape. The same is true of the web-plates 22 and tanks-supporting brackets 23.

The fore part 10 of the vessel and the fore end of the stiff and expandable part A are connected through longitudinal members which are constructed to accommodate the expansion of the part A and thereby avoid inadmissible longitudinal stresses. Thus the plates forming the longitudinal bulkheads 24 in the part 10 are corrugated as illustrated or may have a longitudinally adjustable spigot-and-socket connection. The longitudinal bulkheads 5 must of course not be rigidly fixed to the tanks 1, 2.

E. Elastic joints for running the dome 17 which dome contains the piping for the butane and propane, through the deck 4, while permitting expansion of the tanks 1, 2 under action of interior pressure. The butane and propane piping (27 for the liquid and 28 for the gas) is fixed to the domes going through the deck. It is connected to loading stations provided on the deck by flexible piping, that is to say, piping capable of accommodating the expansion by bending. The filling and emptying of liquids are accomplished by the pipe 27 and those of gases by the pipe 28.

The general features and arrangement of a vessel according to the invention are largely determined by the dimensions of the tanks; such dimensions depend themselves on thicknesses of their plating and on the pressures which they will have to support. These pressures are dependent on the maximum temperatures which the butane and propane will be allowed to attain.

For example let it be supposed that for a voyage between Europe and East Africa the temperature of the propane and butane can be expected to remain below 32° C. or, if the vessel passes through the Red Sea and Indian Ocean below 36° C., the ordinary mean temperature in temperate regions being taken as 20° C. Besides commercial propane and butane, propene and isobutane may have to be transported and should be considered—the latter products are somewhat more volatile than the former.

The following table shows the vapour pressure in kg./sq. cm. of all these products at the temperatures mentioned

|  | 32° C. | 36° C. | 20° C. |
| --- | --- | --- | --- |
| Propane | 14 | 15.4 | 10.6 |
| Commercial propane | 12 | 13.4 | 9 |
| Isobutane | 4.4 | 4.9 | 3.15 |
| Commercial butane | 3.5 | 3.9 | 2.5 |

According to draft regulations dated September 28, 1955, the tanks must be capable of sustaining under test the pressures given in the table below, the calculations being made as follows:

Test pressure (absolute) = 1.4 × (actual maximum pressure encountered) + 4
Measurement being again in kg./sq. cm.

|  | 32° C. | 36° C. | 20° C. | 32° C. | 36° C. | 20° C. |
|---|---|---|---|---|---|---|
|  | Absolute | | | Relative | | |
| Propane | 23.6 | 25.56 | 18.84 | 22.6 | 24.56 | 17.84 |
| Commercial propane | 20.8 | 22.76 | 16.6 | 19.8 | 21.76 | 15.6 |
| Isobutane | 10.16 | 10.86 | 8.41 | 9.16 | 9.86 | 7.41 |
| Commercial butane | 8.9 | 9.46 | 7.50 | 7.9 | 8.46 | 6.50 |

These figures determine test pressures to which the tanks will be submitted. The metal used must be welding steel at 45 kg. per sq. mm., Veritas quality, or HLES steel.

Hydrostatic pressures have not been taken into account for the liquid gas tanks although they will be wholly immersed in petrol or the like when in use. The density of petrol (0.9) is superior to that of liquid gases (0.50 to 0.54).

According to the invention it is preferred to use cylindrical tanks with their axes parallel to the center line of the vessel, so as to allow the tanks to contribute to the strength of the vessel. The diameters of these tanks are restricted by the fact that shaping of the very thick plates will have to be performed without difficulty with standard equipment of shipyards. So as to obtain with the same temperature, same stress and same expansion of the tank in the test, it is necessary to adopt different diameters for tanks intended for methane, propane, or other gas.

Supposing that maximum thickness of plating permissible is 18 mm. in Veritas steel; the formula $$f = p\frac{R}{e} \text{ or } R = \frac{fe}{p}$$

immediately determines the maximum diameter of the tanks.

Thus we obtain in the cases above given allowing a maximum stress of 15 kgs./sq. mm. the following table of maximum radii (measured in metres)

|  | 32° C. | 36° C. | 20° C. |
|---|---|---|---|
| Propene | 1.10 | 1.02 | 1.4 |
| Commercial propane | 1.26 | 1.15 | 1.6 |
| Isobutane | 2.73 | 2.53 | 3.40 |
| Commercial butane | 3.26 | 3.12 | 3.94 |

In this example we are led by the above considerations to use cylinders of the same thickness and 5 m. diameter for butane and 2 m. for propane. The penultimate table immediately indicates the safety-margin of standard use as compared to extreme cases.

Such tanks are completed, as shown, by domes of known type placed above the deck, according to regulations in force; it is also possible to provide expansion tanks located on the deck.

By way of example, the sketches 4, 5 and 6 show an arrangement of three butane tanks of 5 m. diameter and two propane tanks of 2 m. diameter, each tank being 80 m. long and being divided into four parts, each of them being 20 m. long.

An estimate of the approximate weight of the vessel is as follows:

|  | Surface (sq. m.) | Cubic (cub. m.) | Weight, T. |
|---|---|---|---|
| Propane (d=0.54) | 6 | 480 | 216 |
| Butane (d=0.54) | 60 | 4,800 | 2,160 |
| Petrol (d=0.9) | 70 | 5,600 | 4,500 |
| Total | 136 | 10,880 | 6,876 |

Considering a block coefficient of 0.9
Displacement with 2 m. free-board: 11,735 tons, including—

|  | T. |
|---|---|
| Steel hull | 2,350 |
| Tanks, domes and intermediate seating | 1,108 |
| Outfitting | 622 |
| Hull fitted out | 4,080 |
| Machinery | 650 |
|  | 4,730 |
| Available | 130 |
| Deadweight including fuel | 6,876 |
| Displacement | 11,736 |

The trim and stability of this vessel are satisfactory.

If the tanks are made to contribute to the stiffness of the vessel, it will be found that the maximum stress due to bending is 7.5 kg./mm.$^2$. The maximum stress in the longitudinal direction in the tank walls due to fluid pressure will be 4.4 kg./mm.$^2$ for propane or 2.9 kg./mm.$^2$ for butane. In the most adverse conditions with the stresses in the same direction, the total maximum will be 11.9 kg./mm.$^2$ which is quite admissible.

The vessel illustrated is of longitudinal type with webframes and bulkheads. The tanks may be taken into consideration in the study of hull resistance. Engine room and fore part are separated from the tanks by regular cofferdams; but cylinders of the tanks crossing such cofferdams are rigidly connected to the ends, according to present regulations of classification societies in force, that is to say in extending five frames. The part of the cylinders which runs through the cofferdams is openwork and contains no cargo.

The end and intermediate bulkheads of the tanks are either spherical, or flat and strengthened to take account of fluid pressures, which may act on one or other side of the intermediate bulkheads.

The expansion of the tanks under pressure is as follows:

Using, by way of example, the data taken in previous calculations, it is determined that for a test stress of 15 kg./sq. mm. elastic deformations are of $15/20,000 = 0.75$ mm. per meter.

Under the most adverse conditions, expansion will be 3.7 mm. on the diameter of the butane cylinders and 1 mm. on the diameter of propane cylinders. In normal working it will be reduced in both cases to a figure around one millimeter; so it is negligible: (propane=0.85 mm., butane=1.39 mm.)

The longitudinal extension is 60 mm. in both cases. However it is not necessary to test the whole length of the cylinders at once. By restricting the tests to one element of 20 m., the extension is 15 mm.

Under normal working condition, the total deformation is for extreme cases (with the most volatile gases and 36°) 24 mm. for the butane cylinders and 35 mm. for the propane cylinders. It is not negligible and it has been taken into consideration above by the provision of deformable joints at the domes and by the connection of the tanks to the hull.

A vessel on the general lines as described above can, without departing from the scope of the invention, be used to transport a gas which cannot be liquified at ordinary ambient temperatures, such as methane, which must be cooled to a low temperature before liquefying. The consequent contraction of the tanks will be absorbed in the manner above described.

What I claim is:

1. A ship for transporting pressure liquefied gas, comprising a hull having bow and stern sections, spaced longitudinal bulkheads extending fore and aft between said bow and stern sections, at least one pressure-resistant cylindrical tank disposed lengthwise within said ship and between said longitudinal bulkheads, said tank being subject to longitudinal and radial expansion and contraction, a plurality of water-tight transverse flexible bulkheads mounted in spaced relation between said longitudinal bulkheads and secured to said longitudinal bulkheads and to said hull, each of said transverse bulkheads being formed with a circular opening for engaging and radially supporting said tank, said bulkheads being adapted to accommodate radial and longitudinal expansion and contraction of said tank.

2. A ship according to claim 1, wherein said longitudinal bulkheads are flexibly connected to said hull to accommodate longitudinal expansion and contraction.

References Cited in the file of this patent

UNITED STATES PATENTS

| | | |
|---|---|---|
| 2,356,721 | Hagemann | Aug. 22, 1944 |
| 2,464,356 | Stearns | Mar. 15, 1949 |
| 2,600,015 | McLaughlin | June 10, 1952 |
| 2,807,143 | Schnellhardt | Sept. 24, 1957 |

FOREIGN PATENTS

| | | |
|---|---|---|
| 106,351 | Great Britain | May 24, 1917 |